(12) United States Patent
Hirasawa et al.

(10) Patent No.: US 6,713,947 B2
(45) Date of Patent: Mar. 30, 2004

(54) DISPLAY DEVICE AND METHOD OF MANUFACTURING THE SAME

(75) Inventors: Shigemi Hirasawa, Chiba (JP); Yuuichi Kijima, Chousei (JP); Hiroshi Kawasaki, Ooamishirasato (JP)

(73) Assignees: Hitachi, Ltd., Tokyo (JP); Hitachi Device Engineering Co. Ltd., Chiba-ken (JP)

( * ) Notice: Subject to any disclaimer, the term of this patent is extended or adjusted under 35 U.S.C. 154(b) by 76 days.

(21) Appl. No.: 10/126,144

(22) Filed: Apr. 19, 2002

(65) Prior Publication Data

US 2002/0171347 A1 Nov. 21, 2002

(30) Foreign Application Priority Data

May 16, 2001 (JP) ........................................ 2001-145966

(51) Int. Cl.$^7$ .................................................. H01J 1/30
(52) U.S. Cl. ........................ 313/313; 313/309; 313/351; 313/495
(58) Field of Search ................................ 313/495, 497, 313/309, 336, 351

(56) References Cited

U.S. PATENT DOCUMENTS 6,504,292 B1 * 1/2003 Choi et al. .................. 313/310
6,525,453 B2 * 2/2003 Cheng et al. ................ 313/309

FOREIGN PATENT DOCUMENTS

| EP | 1 020 888 A1 | 7/2000 |
| JP | 2000-21305 | 1/2000 |
| JP | 2000-204304 | 7/2000 |
| JP | 2000-223004 | 8/2000 |

* cited by examiner

*Primary Examiner*—Ashok Patel
(74) *Attorney, Agent, or Firm*—Milbank, Tweed, Hadley & McCoy LLP

(57) ABSTRACT

A display device can realize the highly efficient electron emission characteristics by ensuring the exposure of carbon nanotubes 13 in the inside of a vacuum by fixing the carbon nanotubes 13 to cathode wires 12 such that the carbon nanotubes 13 are not easily removed from the cathode wires 12 with the small resistance which enables the carbon nanotubes 13 to have the enough electron emission ability. Some end portions or some intermediate portions of the carbon nanotubes 13 are embedded into the cathode wires 12 formed on a rear substrate 11 and, at the same time, contact points where the carbon nanotubes 13 cross each other or portions in the vicinity of the crossing portions are bonded to each other by bonding films 14.

9 Claims, 7 Drawing Sheets

DISPLAY DEVICE AND METHOD OF MANUFACTURING THE SAME

BACKGROUND OF THE INVENTION

The present invention relates to a display device which utilizes an emission of electrons into a vacuum, and more particularly, to a display device which can enhance the display characteristics by implementing electron emitting sources enabling the stable control of an electron emission quantity and a method of manufacturing the display device.

As a display device which exhibits the high brightness and the high definition, color cathode ray tubes have been widely used conventionally. However, along with the recent request for the higher quality of images of information processing equipment or television broadcasting, the demand for planar displays (panel displays) which are light in weight and require a small space while exhibiting the high brightness and the high definition has been increasing.

As typical examples, liquid crystal display devices, plasma display devices and the like have been put into practice. Further, particularly, as display devices which can realize the higher brightness, it is expected that various kinds of panel-type display devices including a display device which utilizes an emission of electrons from electron emitting sources into a vacuum (hereinafter, referred to as "an electron emission type display device" or "a field emission type display device") and an organic EL display which is characterized by low power consumption will be commercialized.

Among such panel type display devices, as the above-mentioned field emission type display device, a display device having an electron emission structure which was invented by C. A. Spindt et al (for example, see U.S. Pat. No. 3,453,478, Japanese Laid-open Patent Publication 21305/2000), a display device having an electron emission structure of a metal-insulator-metal (MIM) type, a display device having an electron emission structure which utilizes an electron emission phenomenon based on a quantum theory tunneling effect (also referred to as "surface conduction type electron emitting source, see Japanese Laid-open Patent Publication 21305/2000), and a display device which utilizes an electron emission phenomenon having a diamond film, a graphite film and carbon nanotubes and the like have been known.

FIG. 10 is a schematic view for explaining the fundamental constitution of a field emission type display device. In the drawing, CNT indicates carbon nanotubes mounted on a cathode K and A indicates an anode, wherein a fluorescent material PH is formed on an inner surface of the anode A. By applying a voltage Vs between a control electrode G disposed in the vicinity of the cathode K and the cathode K, electrons e are emitted from the carbon nanotubes CNT, while by applying a high voltage Eb between the cathode K and the anode A, the electrons are accelerated and are made to impinge on the fluorescent material PH so that the fluorescent material PH is excited whereby irradiating colored light L which depends on the composition of the fluorescent material PH.

Then, by controlling an electron emission quantity (including turning on and off of emission) in response to the modulated voltage Vs given to the control electrode G disposed in the vicinity of the cathode K, the magnitude (brightness) of the colored light L can be controlled. Here, by providing a focusing electrode F of a given potential between the control electrode G and the anode A so as to focus the electrons e on the fluorescent material PH, the utilization efficiency of the electrons which excite the fluorescent material PH can be enhanced.

FIG. 11A and FIG. 11B are schematic views showing one constitutional example of a known field emission type display device, wherein FIG. 11A is an exploded perspective view and FIG. 11B is a cross-sectional view of the display device after assembling. In this field emission type display device, a face panel 2 having anodes and fluorescent material layers on an inner surface thereof and a rear panel 1 on which field emission type electron emitting sources and control electrodes are formed are arranged to face each other in an opposed manner, a sealing frame 5 is interposed between inner peripheries of these panels so as to seal a space between them, and the inside which is defined by the face panel 2, the rear panel 1 and the sealing frame 5 is reduced to a low pressure (including a vacuum) lower than an external atmospheric pressure or is evacuated (referred to as "vacuum" hereinafter).

As shown in FIG. 11A, in this field emission type display device, the rear panel 1 having a substrate 11 preferably made of glass, alumina or the like and the electron emitting sources and the face panel 2 having a substrate 21 made of a light transmitting material such as glass and fluorescent materials are arranged to face each other in an opposed manner.

The sealing frame 5 made of glass or the like is arranged between the rear panel 1 and the face panel 2. This sealing frame 5 is sealed to the rear panel 1 and the face panel 2 respectively using frit glass or the like.

The electron emitting sources and the control electrodes which are not shown in the drawings are formed on the inner surface of the substrate 11 which constitutes the rear panel 1. Cathode terminals 70 which are pulled out from cathodes constituting the electron emitting sources and control electrode terminals 50 which are pulled out from the control electrodes being disposed by way of an insulation layer 16 with respect to the cathodes are provided to a periphery of the rear panel 1. Further, the anodes and the fluorescent materials not shown in the drawings are formed on an inner surface of the substrate 21 which constitutes the face panel 2.

In the drawing, a dotted line 51 depicted on an upper surface of the substrate 11 of the rear panel 1 indicates positions where the outer periphery of the sealing frame 5 is brought into contact with the upper surface of the substrate 11. An exhaust pipe 6 is provided to the outside of a display region of the rear panel 1 and to the inside of the sealing frame 5, and the inside which is surrounded by respective main surfaces of the rear panel 1, the face panel 2 and the sealing frame 5 is evacuated to a vacuum of $10^{-5}$ to $10^{-7}$ Torr, for example, by discharging air from the inside.

The carbon nanotubes (CNT) are extremely fine needle-like carbon compound (in a strict sense, molecules formed by binding carbon atoms in a net form and a columnar form) and are used as electron emitting sources when they are arranged on the cathode wires.

In mounting the carbon nanotubes on the cathode wires, a method which coats and bakes a paste in which carbon nanotubes are mixed, a method which exposes end portions of carbon nanotubes in an electric field space by coating a paste in which nickel is mixed as conductive fillers to carbon nanotubes and baking and polishing, or a method which coats a silver paste in which carbon nanotubes are mixed and bakes such silver paste or the like has been adopted.

However, it has been difficult to firmly fix the carbon nanotubes to the cathode wires and to arrange the carbon nanotubes such that end peripheries of the carbon nanotubes which constitute electron emitting portions are efficiently exposed in the inside of the vacuum. When only the paste formed of the carbon nanotubes is used, the electric resistance between carbon nanotubes which constitute needle-like crystals is large and hence, the carbon nanotubes exhibits the small electron emission ability compared to a case the paste is baked with the conductive fillers made of nickel or the like.

When the paste containing nickel (Ni) or the like is used, it is necessary to remove nickel particles exposed on an uppermost surface by polishing. The polishing of such ultra-fine particles is difficult and hence, the method is not suitable for the mass production. Further, the carbon nanotubes which are exposed to the electric field space are substantially formed of only portions which are protruded from a polished surface so that the electron emitting area cannot be increased as it was expected.

Further, when the silver paste is used, most of carbon nanotubes are embedded in the inside of the silver layer or exposed portions are dissipated in the baking step so that it is difficult to sufficiently make use of the original electron beam emitting characteristics of the carbon nanotubes.

It is necessary for the carbon nanotubes to expose the needle-like end portions thereof in the inside of the vacuum and the carbon nanotubes are required to be firmly held on the cathode electrodes to prevent the removal thereof from the cathode electrodes. However, the conventional technique is not sufficient to commercialize such structures in a display device and this constitutes a problem to be solved.

Accordingly, it is an object of the present invention to provide a display device and a manufacturing method of the same which can solve the above-mentioned problem and can realize the highly efficient electron emission characteristics by ensuring the low resistance which enables the carbon nanotubes to have the enough electron emission ability and by ensuring the exposure of the carbon nanotubes in the inside of a vacuum by fixing the carbon nanotubes on cathode wires such that the carbon nanotubes are not easily removed from the cathode wires.

SUMMARY OF THE INVENTION

To achieve the above-mentioned object, a display device and a manufacturing method thereof according to the present invention have following fundamental constitutions.

Typical constitutions of the present invention are described hereinafter. First of all, following constitutions are listed as the constitutions of the display device of the present invention.

(1) In a display device performing a display using electrons emitted from electron emitting sources, each electron emitting source includes a large number of carbon nanotubes and portions of the carbon nanotubes in the vicinity of contact points are bonded to each other by films made of bonding material.

Due to such a constitution, the carbon nanotubes are connected with each other by the films made of bonding material and hence, an assembled body of carbon nanotubes which have distal ends thereof sufficiently exposed and have sufficient strength as the electron emitting sources can be formed.

Further, since the distance between the carbon nanotubes becomes stable, the conductive resistance becomes stable and hence, the stable electron emission ability (emission) can be obtained.

(2) Each film made of bonding material in the constitution (1) includes a film produced by baking bonding material which generates a sol-gel reaction by baking.

Due to such a constitution, a larger number of contact points of the carbon nanotubes can be formed due to the shrinkage at the time of baking. Further, the distance between the carbon nanotubes is narrowed due to the shrinkage and hence, the contact area is increased thus lowering the resistance. Here, silica-based material is preferable as the bonding material which generates the sol-gel reaction.

(3) A film obtained by baking the bonding material which generates the sol-gel reaction in the constitution (2) is a film having conductivity.

Due to such a constitution, the bonding material is formed of material having conductivity and hence, the carbon nanotubes exhibit the low resistance and enhance the electron emission ability thereof. As the conductive material added to the bonding material, particles (ultra-fine particles) made of metal oxide such as ITO or other metal can be used.

(4) The bonding material made of conductive material is provided in the vicinity of the contact points of the carbon nanotubes in the constitution (2).

(5) As the bonding material made of conductive material in the constitution (4), bonding material produced by baking material formed of ultra-fine metal particles coated with resin is used. With respect to this conductive material, resin coated on the ultra-fine metal particles is dissipated and the ultra-fine metal particles remain at the crossing portions of the carbon nanotubes and in the vicinity of the crossing portions so as to connect the carbon nanotubes with each other.

With respect to the bonding material in the constitutions (4) and (5), in addition to the material which forms the films based on the sol-gel reaction, as the conductive material in the constitution (4), the ultra-fine metal particles in the constitution (5) which are coated with resin are mixed into the bonding material and the bonding material is baked so that the ultra-fine metal particles remain in the vicinity of the contact points of the carbon nanotubes. This carbon nanotubes exhibit the stable and low resistance and hence, the electron emission ability can be enhanced.

(6) The bonding material in the constitution (1) is bonding material formed of conductive material. Since the bonding material is conductive, the resistance of the carbon nanotubes is reduced compared to the insulating bonding material so that the resistance becomes stable. The bonding material is not limited to those produced by the sol-gel reaction.

(7) Using the ultra-fine metal particles coated with resin as the bonding material made of conductive material in (6), the wettability of the bonding material with the carbon nanotubes is improved. Further, the resin coating is decomposed by baking so that the ultra-fine particles made of metal function as the bonding material and hence, it is possible to produce the bonding material which exhibits the more stability and the less resistance compared with the insulating bonding material.

(8) The electron emitting sources in the constitutions (1) to (7) are formed on conductive cathode wires and portions of the carbon nanotubes are embedded into the cathode wires.

(9) The cathode wires in the constitution (8) include conductive material which is melted or sintered in a temperature range of 150 degree centigrade to 600 degree centigrade.

Since at least the surfaces of the cathode wires are melted or sintered and portions of the carbon nanotubes are embedded into the cathode wires in the baking process, the removal of the carbon nanotubes can be suppressed. To be more specific, the cathode wires contain the conductive material which is melted or sintered in a temperature range of 150 degree centigrade to 600 degree centigrade as constituted in the constitution (9).

Due to the above-mentioned respective constitutions, it is possible to obtain the display device having the highly efficient electron emission ability by fixing the carbon nanotubes to the cathode wires with low resistance and in a state that the carbon nanotubes are not easily removed from the cathode wire and by surely exposing the distal ends of carbon nanotubes in the inside of the vacuum.

Further, as the manufacturing method of a display device, following constitutions can be listed.

(10) In one method, at the time of forming electron emitting sources of the display device which performs a display by utilizing electrons emitted from the electron emitting sources having carbon nanotubes formed on cathode wires, a paste containing the carbon nanotubes is applied to the cathode wires and, thereafter, bonding material which generates a sol-gel reaction by baking is applied to the paste, and the paste and the bonding material are baked.

In this method, the bonding material for the carbon nanotubes is produced by using the so-called sol-gel reaction and hence, contact portions between the carbon nanotubes are increased in number due to the shrinkage at the time of baking whereby the assembly of the carbon nanotubes having the strength can be formed as the electron emitting sources by bonding the contact portions. Further, since the distance between the carbon nanotubes becomes stable, the conductive resistance becomes stable and the stable electron emission ability is obtained.

(11) Conductive material is added to a solution made of the bonding material which generates the sol-gel reaction by baking in the constitution (10). Since the films formed of the bonding material have the conductivity, the carbon nanotubes exhibit the small resistance. Accordingly, the carbon nanotubes can enhance the electron emission ability.

(12) In manufacturing a display device which performs a display using electrons emitted from electron emitting sources having carbon nanotubes formed on cathode wires, a paste which contains the carbon nanotubes and ultra-fine metal particles coated with resin is applied to cathode wires and, thereafter, the paste is baked.

With the use of the paste containing ultra-fine metal particles coated with resin, the wettability of the paste with the carbon nanotubes can be improved. Further, the resin coating is decomposed by baking and the ultra-fine metal particles function as the bonding material and hence, it is possible to produce the more stable and less resistant bonding material compared with the insulating bonding material.

(13) A solution of bonding material which generates a sol-gel reaction by baking is applied between the applying of the paste and the baking of the paste in the constitution (12).

In addition to the bonding of the carbon nanotubes due to the ultra-fine metal particles coated with resin, the contact between the carbon nanotubes is increased due to the shrinkage of the films formed by the sol-gel reaction whereby it is possible to constitute the low-resistant electron emitting sources.

(14) Conductive material is added into the solution of bonding material which generates a sol-gel reaction by baking in the constitution (13).

By adding the conductive material into the solution of bonding material which generates the sol-gel reaction, it is possible to constitute the electron emitting sources which exhibit less resistance compared to the electron emitting sources in the constitution (13).

(15) A quantity of the bonding material in the constitutions (10) to (14) is a quantity which is sufficient for forming films in the vicinity of contact points of the carbon nanotubes after baking.

When a quantity of the bonding material is excessively large, the bonding material wraps the whole carbon nanotubes and considerably reduces the formation of the distal ends of the carbon nanotubes which constitute electron emitting sources. On the other hand, when a quantity of the bonding material is excessively small, it is difficult to bond the contact points of the carbon nanotubes sufficiently. Accordingly, a quantity of the bonding material is set to a quantity which allows the bonding material to form films in the vicinity of the contact points of the carbon nanotubes.

(16) The cathode wires in the constitutions (10) to (14) contain material which is melted or sintered at a temperature for baking the paste containing the carbon nanotubes and the paste is applied to the material which is melted or sintered.

Due to such a method, the carbon nanotubes can make portions thereof embedded into the cathode wires in the baking step and hence, the removal of the carbon nanotubes can be suppressed.

Due to the above-mentioned respective manufacturing methods, it is possible to obtain the display device having the highly efficient electron emission ability by fixing the carbon nanotubes to the cathode wires with low resistance and in a state that the carbon nanotubes are not easily removed from the cathode wire and by surely exposing the distal ends of the carbon nanotubes in the inside of the vacuum.

Here, the present invention is not limited to the above-mentioned constitutions and the constitutions of embodiments which will be explained hereinafter and various modifications are conceivable without departing from the technical concept of the present invention.

BRIEF DESCRIPTION OF THE DRAWINGS

FIG. 2A and FIG. 2B are explanatory views of a constitutional example in which the electron emitting source shown in FIG. 1 is applied to the display device, wherein FIG. 2A is a plan view of the electron emitting source constituting one pixel and FIG. 2B is a cross-sectional view in the vicinity of one pixel taken along a line D—D of FIG. 2A.

FIG. 11A and FIG. 11B are schematic views of one constitutional example of a known field emission type display device, wherein FIG. 11A is an exploded perspective view and FIG. 11B is a cross-sectional view of the display device after assembling.

DESCRIPTION OF THE PREFERRED EMBODIMENTS

Preferred embodiments of the present invention are explained in detail hereinafter in conjunction with drawings which show these embodiments.

Figure 1:
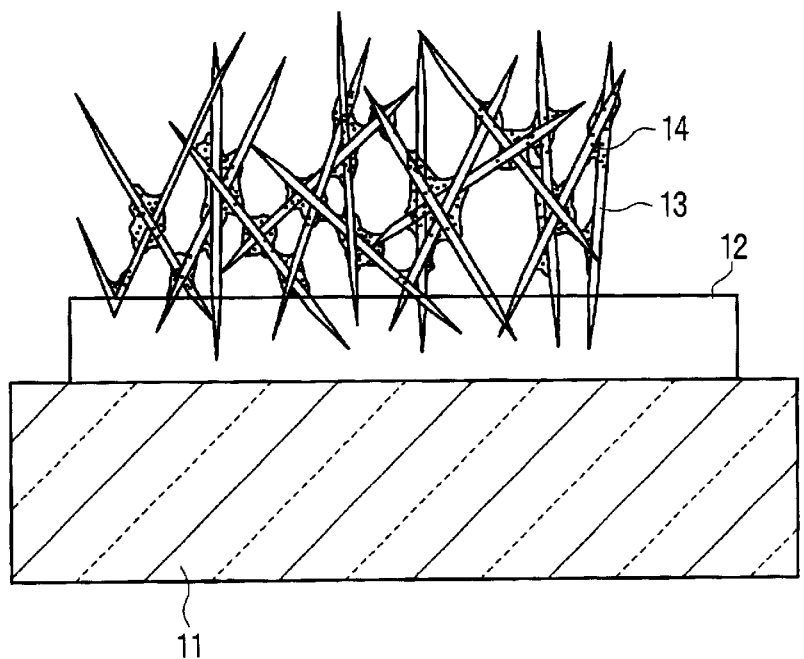
FIG. 1 is a schematic cross-sectional view of an electron emitting source for explaining a first embodiment of a field emission type display device according to the present invention.

FIG. 1 is a schematic cross-sectional view of an electron emitting source for explaining a first embodiment of a field emission type display device according to the present invention. In FIG. 1, reference numeral 11 indicates a substrate which constitutes a rear panel 1 and a glass plate is used as the rear panel 1. A cathode wire 12 is formed on an inner surface (upper-side surface in the drawing) of the substrate 11. Although the cathode wire 12 may be formed by directly drawing using a printing method, an inkjet method or the like, the cathode wire 12 is formed by a screen printing using a silver paste in this embodiment.

A large number of carbon nanotubes 13 are formed on the cathode wire 12 in an erected manner in a state that end portions (or intermediate portions) of some carbon nanotubes 13 are embedded in the cathode wire 12. A large number of carbon nanotubes 13 cross each other and have contact points (crossing portions) at some of portions where these carbon nanotubes 13 cross each other. These carbon nanotubes 13 also have films made of bonding material (bonding films) 14 in the vicinity of these contact points or crossing portions.

The bonding films 14 are formed by making use of a so-called sol-gel reaction. As material of the bonding films 14, a silica-based adhesive agent or the like is used. The bonding film 14 is formed between the carbon nanotubes 13 which have the contact points and the carbon nanotubes 13 which are disposed in the vicinity of these contact points so that the bonding films 14 have a function of integrating a large number of carbon nanotubes 13 as a group in which the carbon nanotubes 13 are connected with each other as a whole.

Accordingly, the carbon nanotubes 13 which have end portions or intermediate portions thereof embedded in the cathode wire 12 are connected with the carbon nanotubes 13 which are spaced apart from the cathode wire 12 by means of the bonding films 14 so that the whole carbon nanotubes 13 are fixed to the cathode wire 12.

The bonding films 14 are films which are formed by coating a paste of the carbon nanotubes 13 on the cathode wire 12 and, thereafter, by baking the bonding material which generates the sol-gel reaction by baking. That is, when the bonding material is baked, the carbon nanotubes 13 are made to cross each other due to a shrinking action of the bonding material so that the carbon nanotubes 13 have the contact points or approach each other whereby the bonding films 14 are formed at these contact points or crossing portions disposed close to the carbon nanotubes 13.

Accordingly, the resistance of the carbon nanotubes 13 as a whole becomes small and the distance between the carbon nanotubes 13 can be held in a stable state.

As the bonding material which generates the sol-gel reaction, metal alkoxide such as tetramethoxysilane (Si $(OCH_3)_4$) can be used. The metal alkoxide has a constitution of metal+alkoxide group. The alkoxide group is a group in which hydrogen (H) is removed from alcohol and methoxy group ($OCH_3$) is obtained by removing hydrogen from methanol, for example.

When a portion of metal is constituted of Si, the metal is referred to as a silica group. In place of Si, alkoxide using titanium (Ti), aluminum (Al), zirconium (Zr) or the like may be used. Further, the alkoxide which uses Ti, Al, Zr may be added into alkoxide which uses Si.

Further, as the paste, a paste produced by adding $In_2O_3$ ($In_2O_3$—$SnO_2$): ITO) doped with several percent of $SnO_2$ into a solution of metal alkoxide is used. Then, the paste is subjected to the sol-gel reaction by baking so that the produced bonding film has the conductivity. Here, in place of ITO, ATO (paste which uses antimony (Sb) in place of indium In) or IZO (paste which uses Zn in place of Sn) may be used.

By coating the paste to which material having the electric conductivity is added and by baking the paste thereafter, the electric conductivity is given to the bonding film 14 generated by the sol-gel reaction so that the resistance of the electron emitting source made of the carbon nanotubes 13 can be reduced and the electron emission ability can be further enhanced. Further, in this embodiment, the paste includes material which is melted (for example, Au, Ag or the like) or material which is sintered (for example, Ni or the like) at a temperature of baking the paste as the material of the cathode wire 12 (150 degree centigrade to 600 degree centigrade, preferably 300 degree centigrade to 600 degree centigrade, and more preferably 400 degree centigrade to 600 degree centigrade). Due to such compositions, it is possible to embed portions of the carbon nanotubes 13 into the cathode wire 12 in the baking step so that the carbon nanotubes 13 can be firmly fixed. Here, without using such a material, the carbon nanotubes 13 and the cathode wire 12 may be fixed to each other using the bonding films 14. However, the above-mentioned embedding method is preferable since the carbon nanotubes 13 can be firmly fixed to the cathode wire 12. The same goes for embodiments described hereinafter.

Figure 2A:
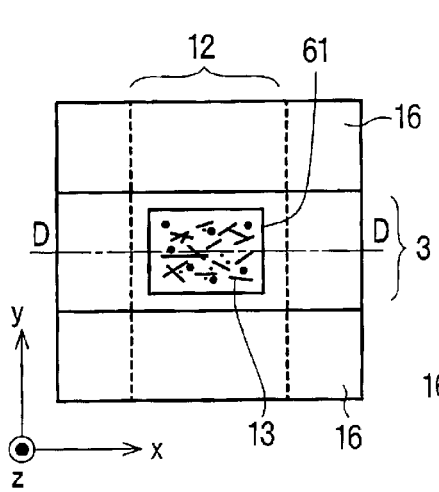
Figure 2B:
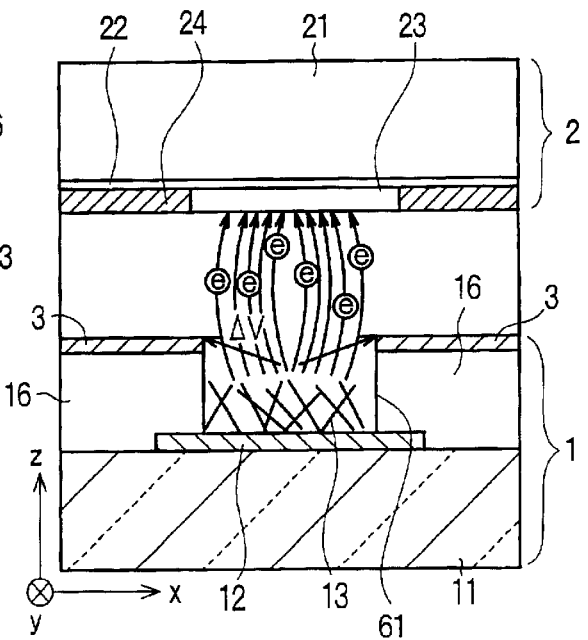

FIG. 2A and FIG. 2B are explanatory views of a constitutional example in which the electron emitting source shown in FIG. 1 is applied to a display device, wherein FIG. 2A is a plan view of the electron emitting source which constitutes one pixel and FIG. 2B is a cross-sectional view in the vicinity of one pixel taken along a line D—D of FIG. 2A.

In FIG. 2A and FIG. 2B, numeral 1 indicates a rear panel and a space between the rear panel 1 and a face panel 2 is evacuated. The rear panel 1 includes cathode wires 12 which are extended in the y direction of the rear substrate 11 on an inner surface thereof. Further, the rear panel 1 includes electron emitting sources thereof which are constituted of carbon nanotubes 13. The carbon nanotubes 13 are integrated by the bonding films 14 shown in FIG. 1 in a hole 61 formed in an insulation layer 16 formed over the cathode wire 12. A control electrode 3 is formed such that the control electrode 3 faces the hole 61 formed in the insulation layer 16.

A plurality of cathode wires 12 are arranged in the x direction and the electron emitting sources are arranged in a matrix array in the x-y directions thus forming a two-dimensional display region. An anode 22 is matted on an inner surface of the face panel 2 and a fluorescent material 23 is formed on the anode 22 as an upper layer. Light absorbing layers (black matrix) 24 are formed at both sides of the fluorescent material 23 thus enhancing the contrast.

Electrons (indicated by e surrounded by circles in the drawing) emitted from the carbon nanotubes 13 are directed toward the anode 22 due to a voltage applied between the cathode wire 12 and the anode 22. A control electrode 3 controls an emission quantity (including turning on and off) of electrons in response to the magnitude of a voltage applied between the control electrode 3 and the cathode electrode 12 (accordingly, voltage between the control electrode 3 and the carbon nanotubes 13) ΔV whereby the luminescence brightness of the fluorescent material 23 is controlled.

Although not shown in the drawing, a focusing electrode may be arranged between the control electrode 3 and the anode 22 so as to focus electrons generated by the carbon nanotubes 13 on the anode 22.

In this embodiment, there is no fear that the carbon nanotubes 13 which constitute the electron emitting source fall from the cathode wire 12 and the carbon nanotubes 13 are sufficiently exposed to the inside of the vacuum and hence, a display device which is free from the reduction of the electron emission ability can be obtained.

As a second embodiment of the present invention, a conductive material is contained in the above-mentioned insulating bonding material. The conductive material contained in the bonding material is used in a state that the conductive material such as ITO or the like or conductive particles made of metal or the like are mixed into a silica-based adhesive agent as fine fillers. Further, at least the surface of the cathode wire 12 and portions of the cathode wire 12 in the vicinity of the surface are melted or sintered at the time of baking so that end portions or intermediate portions of the carbon nanotubes 13 are fixed to the cathode wire 12 in an embedded form.

The electron emitting source of low resistance can be realized also by this embodiment. Further, there is no fear that the carbon nanotubes 13 which constitute the electron emitting source fall from the cathode wire 12 and the carbon nanotubes 13 are sufficiently exposed to the inside of the vacuum and hence, a display device which is free from the reduction of the electron emission ability can be obtained.

Further, in a third embodiment, a conductive bonding material which is formed of ultra-fine particles made of metal such as gold, silver or the like and covered with resin is used as the bonding material. When this bonding material is baked, the resin coated on the ultra-fine particles made of metal is dissipated and the remaining ultra-fine particles made of metal bond the carbon nanotubes together at the crossing portions of the carbon nanotubes or in the vicinity of the crossing portions. Further, at least the surface of the cathode wire 12 and portions of the cathode wire 12 in the vicinity of the surface thereof are melted or sintered at the time of baking so that end portions or intermediate portions of the carbon nanotubes 13 are fixed to the cathode wire 12 in an embedded form.

Also in this embodiment, there is no fear that the carbon nanotubes 13 which constitute the electron emitting source fall from the cathode wire 12 and the carbon nanotubes 13 are sufficiently exposed to the inside of vacuum whereby a display device which is free from the reduction of the electron emission ability can be obtained.

The baking temperature in the above-mentioned respective embodiment is in a temperature of 150 degree centigrade to 600 degree centigrade, preferably 300 degree centigrade to 600 degree centigrade, and more preferably 400 degree centigrade to 600 degree centigrade. The baking at this temperature brings about the sol-gel reaction of the bonding material, the dissipation of resin in the conductive bonding material and the melting or the sintering of portions of the cathode wire 12 in the vicinity of the surface thereof so that it is possible to embed the carbon nanotubes 13 into the cathode wire 12.

Subsequently, the manufacturing method of the display device according to the present invention is explained. The manufacturing method according to the present invention includes a manufacturing step of the rear panel 1, a manufacturing step of the face panel 2, and a step for laminating the manufactured rear panel 1 and the manufactured face panel 2 to each other.

Figure 3:
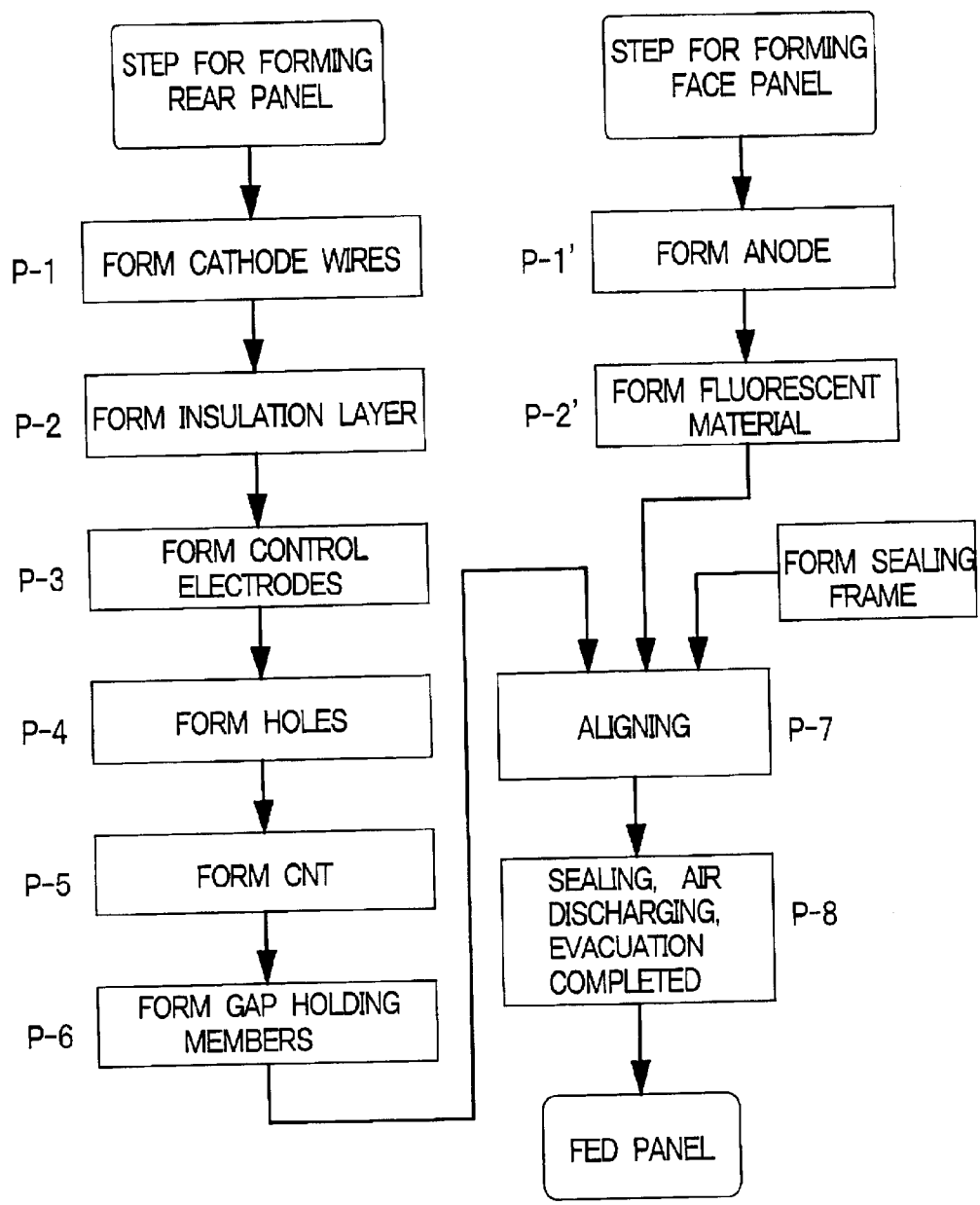
FIG. 3 is an explanatory view of the whole steps of one embodiment of a manufacturing method of a display device according to the present invention.

FIG. 3 is an explanatory view of the whole steps of one embodiment of the manufacturing method of a display device according to the present invention. Respective steps are indicated by "P". First of all, the glass substrate which constitutes the substrate 11 of the rear panel 1 is annealed and, thereafter, the cathode wires 12 are formed (P-1). A plurality of cathode wires 12 corresponding to the pixel density are formed on the glass substrate (substrate 11) in parallel in one direction. The cathode wires 12 are formed by a printing method using a conductive paste made of silver, copper, aluminum or other material or are formed by patterning conductive thin films made of silver, copper, aluminum or other material using a photolithography technique.

The insulation layer 16 is formed such that the cathode wires 12 are covered with the insulation layer 16 (P-2). The insulation layer 16 is made of heat-resistant material such as lead-glass-based dielectric or the like. A conductive layer which will form the control electrodes 3 are formed on the insulation layer 16 (P-3). Then, portions of the insulation layer 16 which correspond to the pixels are removed together with the conductive layer so as to form the holes 61, wherein the cathode wires 12 are exposed to bottom portions of the holes 61 (P-4). Although the holes 61 are formed by a wet photolithography technique in view of the material characteristics of the above-mentioned conductive layer and insulation layer 16, other forming method such as a dry forming method can be also used. Further, a mechanical machining means such as a sand blasting method can be used. Here, the control electrodes 3 may be formed after forming the openings 61.

Subsequently, the paste containing carbon nanotubes 13 is applied to these holes 61 by a direct drawing using a printing method or an ink jet method and, thereafter, the carbon nanotubes 13 which bond the respective crossing portions and portions in the vicinity of the crossing portions together using the bonding material (bonding films 14) and embed the end portions or the intermediate portions thereof into the cathode wires 12 are formed (P-5). The paste containing the carbon nanotubes 13 are produced by mixing the carbon nanotubes 13 into a cellulose-based resin. Further, a dispersing agent may be added into the paste. Alternatively, the cellulose-based resin may have a function as the dispersing agent by itself.

Gap holding members are formed between respective pixels or between rows of pixels either in the x direction or in the y direction (P-6). These gap holding members can be formed by arranging glass fibers, for example, between the neighboring pixels or the neighboring rows of pixels.

On the other hand, in manufacturing the face panel 2, the anode 22 is formed on the entire inner surface of the glass substrate like a mat using the conductive thin film preferably made of ITO (P-1') and, thereafter, the fluorescent material 23 is formed for each pixel (P-2'). Here, without using such a method, it is possible to form the anode 22 such that the fluorescent materials 23 are formed (P-2') and, thereafter, a metal thin film made of Al or the like is formed on the fluorescent materials 23 to form the anode 22. This constitutes the structure which is referred to as "metal back".

Then, respective inner surfaces of the above-mentioned rear panel 1 and face panel 2 are arranged to face each other in an opposed manner, the sealing frame 5 made of glass material is inserted between the peripheries of respective panels 1, 2, and the rear panel 1 and the face panel 2 are aligned with each other (P-7). The inside defined by these panels 1, 2 and the sealing frame 5 is sealed using frit glass (formed in a sealed state) and air is discharged from the inside to evacuate the inside (P-8). Through these steps, the field emission type display device which uses the carbon nanotubes 13 as the electron emitting sources is completed.

Figure 11A:
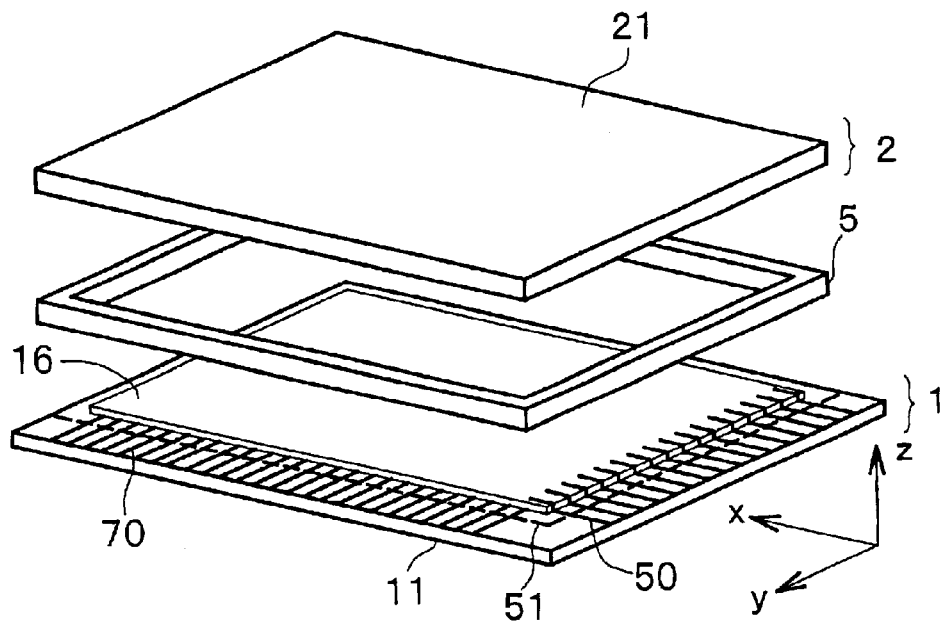
Figure 11B:
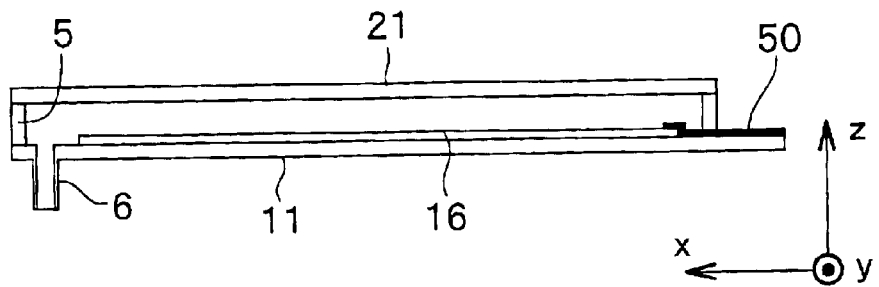

Here, an opening for discharging air is formed in a portion (usually, a corner outside the display region) of the glass substrate (substrate 11) of the above-mentioned rear panel 1 and a discharge pipe 6 (see FIG. 11B) made of glass is mounted on the opening so as to enable the discharging of air.

Figure 4:
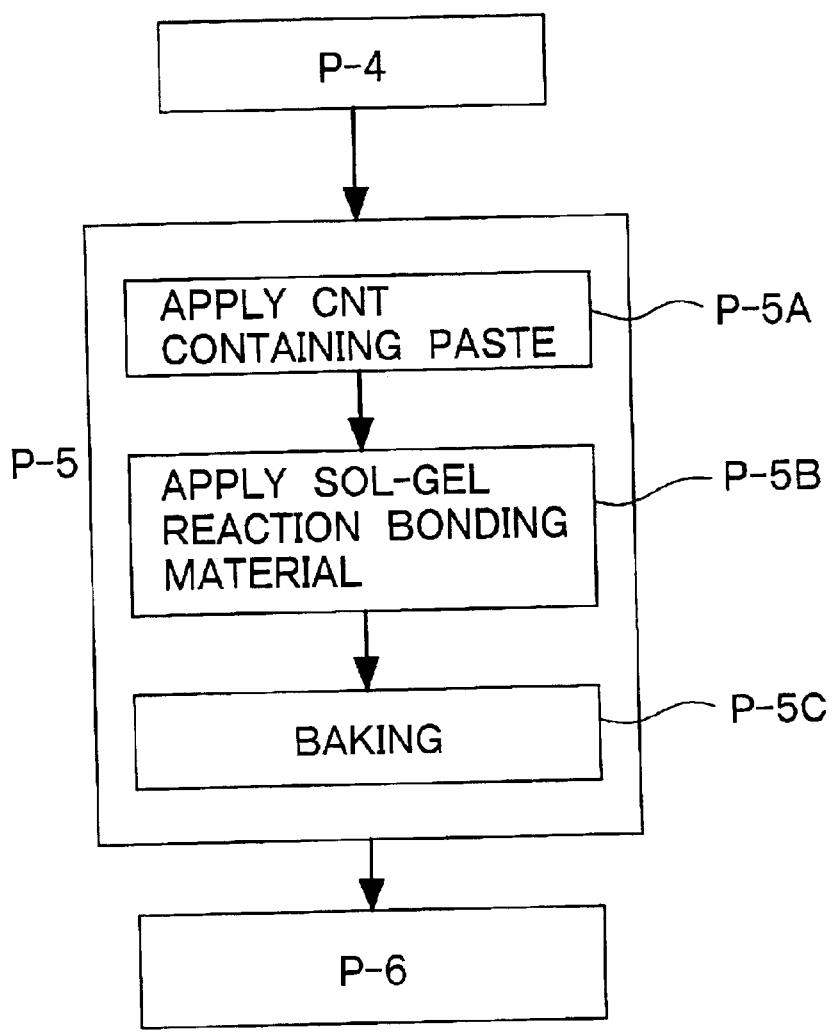
FIG. 4 is a partial flow chart for explaining one embodiment of a step for forming carbon nanotubes constituting electron emitting sources in FIG. 3.
Figure 5:
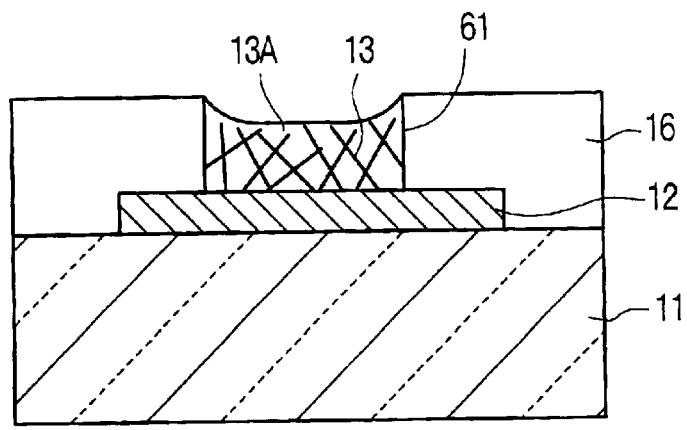
FIG. 5 is a schematic cross-sectional view of one pixel portion corresponding to one step in FIG. 4.
Figure 6:
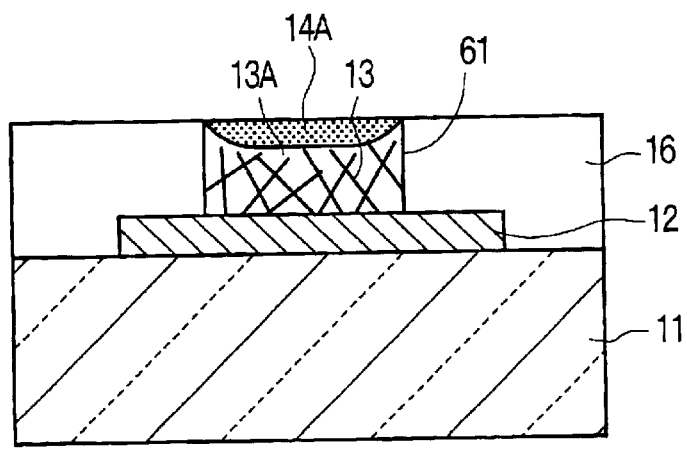
FIG. 6 is a schematic cross-sectional view of one pixel portion corresponding to another step in FIG. 4 which follows the step in FIG. 5.
Figure 7:
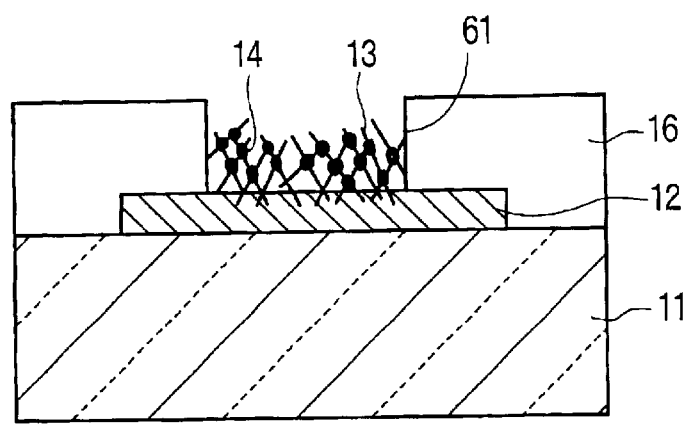
FIG. 7 is a schematic cross-sectional view of one pixel portion corresponding to still another step in FIG. 4 which follows the step in FIG. 6.

FIG. 4 is a partial flow chart for explaining one embodiment of a step for forming carbon nanotubes which constitute the electron emitting source in FIG. 3. FIG. 5 to FIG. 7 are schematic cross-sectional views of one pixel portion corresponding to respective steps shown in FIG. 4. Here, the steps shown in FIG. 4 are explained in conjunction with FIG. 5 to FIG. 7.

After completing the hole forming step (P-4) in FIG. 3, a paste 13A containing carbon nanotubes (CNT) 13 is applied to the holes 61 as shown in FIG. 5. Further, a paste 14A formed of sol-gel reaction bonding material is applied to the holes 61 (P-5B). This operation is shown in FIG. 6. The applying of the sol-gel reaction bonding material 14A is performed using a printing method, an ink jet drawing method or a spray method in the same manner as the applying of the paste 13A containing the carbon nanotubes 13.

Thereafter, these pastes are baked in a temperature range of 150 degree centigrade to 600 degree centigrade in a baking furnace (P-5C). In this baking step, the paste 14A which constitutes the sol-gel reaction bonding material is subjected to a sol-gel reaction and is shrunken and, at the same time, the carbon nanotubes 13 are made to approach and cross each other or are made to approach and the bonding films 14 are formed at the crossing portions or approaching portions (FIG. 7).

Simultaneously with such phenomenon, the portions of the cathode wire 12 in the vicinity of the surface thereof are melted or sintered so that some end portions or some intermediate portions of the carbon nanotubes 13 are embedded into the cathode wire 12 whereby the carbon nanotubes 13 assume, as a whole, a state in which the carbon nanotubes 13 are erected from the cathode wire 12.

Figure 8:
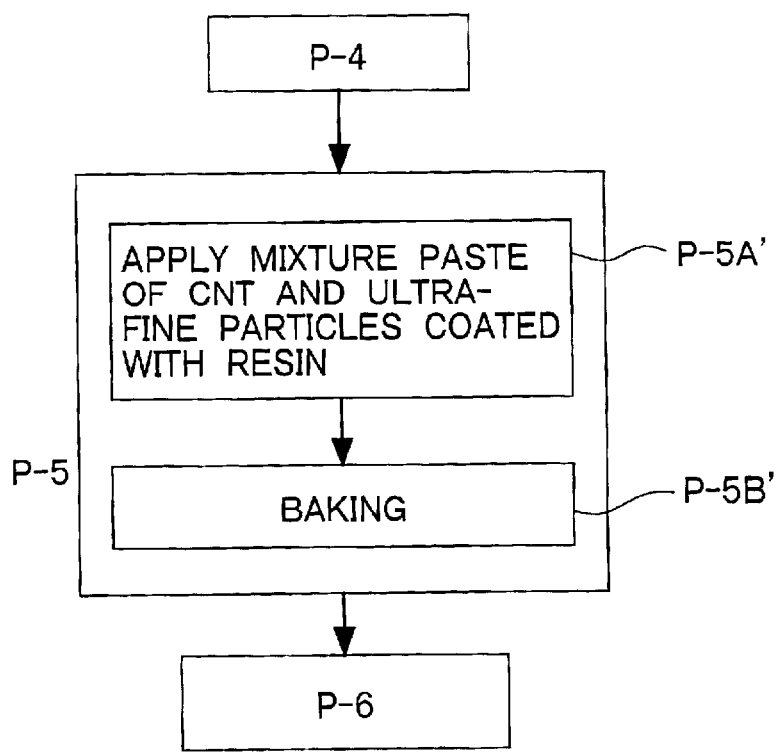
FIG. 8 is a partial flow chart for explaining another embodiment of a step for forming carbon nanotubes constituting electron emitting sources in FIG. 3.

FIG. 8 is a partial flow chart for explaining another embodiment of the step for forming carbon nanotubes which constitute the electron emitting source in FIG. 3. In this embodiment, after completing the hole forming step (P-4) in FIG. 3, a paste 13A in which the carbon nanotubes (CNT) 13 and fine gold particles constituting conductive materials and coated with resin are mixed is applied to the holes 61 (P-5A'). The applying of the paste is performed using a printing method, an ink jet drawing method or a spray method.

Thereafter, the paste is baked in a temperature range of 150 degree centigrade to 600 degree centigrade in a baking furnace (P-5B'). In this baking step, the resin which is coated on the fine gold particles is dissipated and the remaining fine gold particles bond the carbon nanotubes 13 together at the crossing portions of the carbon nanotubes 13 or in the vicinity of the crossing portions. Simultaneously with such phenomenon, the portions of the cathode wire 12 in the vicinity of the surface thereof are melted or sintered so that some end portions or some intermediate portions of the carbon nanotubes 13 are embedded into the cathode wire 12 whereby the carbon nanotubes 13 assume, as a whole, a state in which the carbon nanotubes 13 are erected from the cathode wire 12.

Here, the silica-based bonding material which is explained in conjunction with FIG. 4 may be further mixed into the paste applied in the step P-5A' of FIG. 8. The above-mentioned manufacturing method can manufacture the display device which can realize the highly efficient electron emission characteristics by ensuring the exposure of the carbon nanotubes 13 in the inside of a vacuum by fixing the carbon nanotubes 13 such that the carbon nanotubes 13 are not easily removed from the cathode wires 12 with the low resistance which enables the carbon nanotubes 13 to have the enough electron emission ability.

Figure 9:
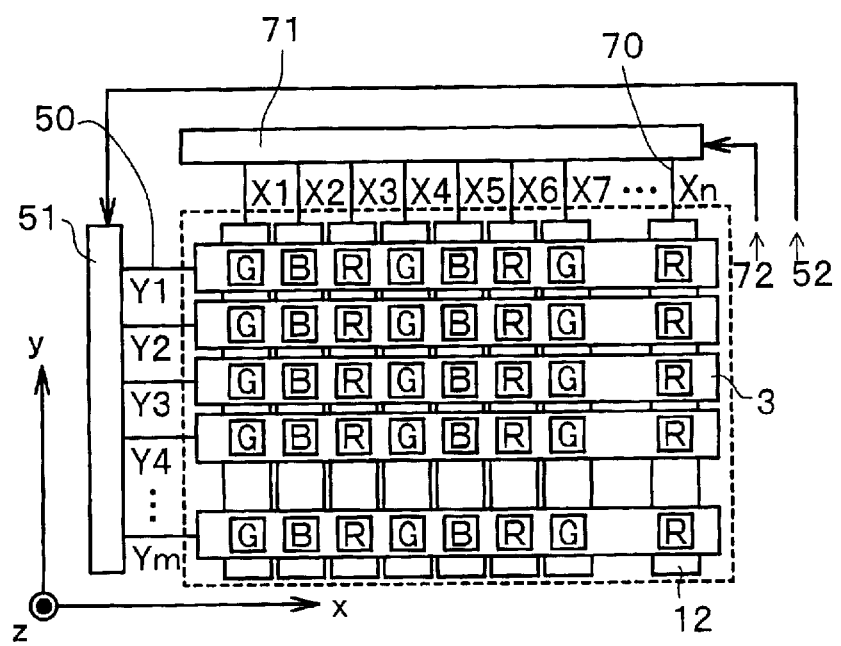
FIG. 9 is an equivalent circuit for explaining a driving method of the display device according to the present invention.
Figure 10:
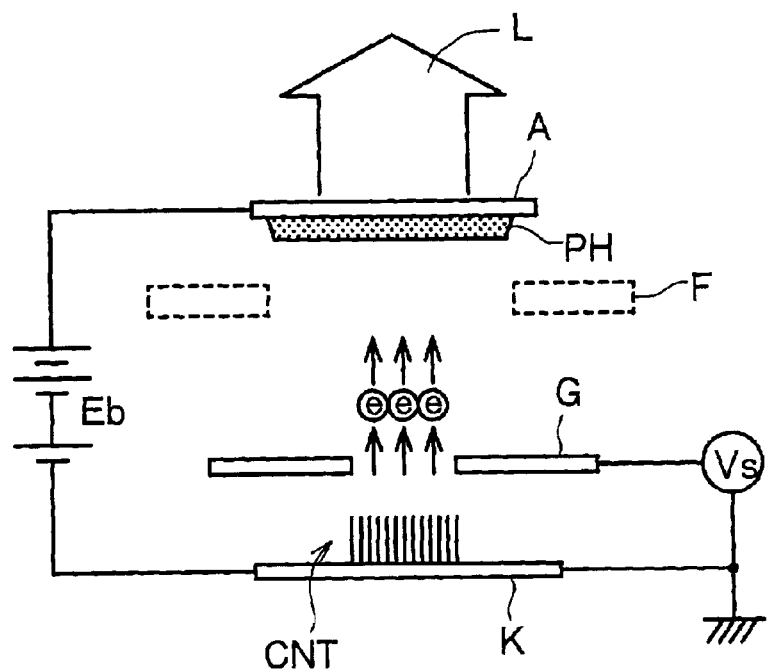
FIG. 10 is a schematic view for explaining the basic constitution of a field emission type display device.

FIG. 9 is an equivalent circuit for explaining a driving method of the display device according to the present invention. In this display device, n pieces of cathode wires 12 extending in the y direction are arranged in parallel in the x direction. Further, m pieces of control electrodes 3 extending in the x direction are arranged in parallel in the y direction thus constituting a matrix array of m rows×n columns together with the cathode wires 12.

On a periphery of a rear panel 1 which constitutes the display device, a scanning circuit 51 and a video signal circuit 71 are arranged. Respective control electrodes 3 are connected with the scanning circuit 51 at control electrode terminals 50 (Y1, Y2, . . . Ym) and respective cathode wires 12 are connected with the video signal circuit 71 at cathode terminals 70 (X1, X2, . . . Xm).

The electron emitting source which has been explained in the above-mentioned embodiments is provided to each one of pixels arranged in a matrix array. The number of electron emitting sources is not limited to one per one pixel and may be two or more per one pixel. R, G, B in the drawing respectively correspond to the pixels of red, green and blue, and lights which correspond to respective colors are made to be emitted from fluorescent materials 23.

Synchronous signals 52 are inputted to the scanning circuit 51. The scanning circuit 51 is connected to the control electrodes 12 through the control electrode terminals 50 and applies a scanning signal voltage to the control electrodes 3 by selecting the row of the matrix.

On the other hand, video signals 72 are inputted to the video signal circuit 71. The video signal circuit 71 is connected to the cathode wires 12 through the cathode terminals 70 (X1, X2, . . . Xn) and applies voltages to the cathode wires 12 by selecting rows of the matrix in response to the video signals 72. Accordingly, given pixels which are sequentially selected by the control electrodes 3 and the cathode wires 12 emit light with given colors thus displaying two-dimensional images.

With the provision of the display device according to this embodiment which uses the carbon nanotubes 13 as the electron emitting sources, the flat panel type display device which is operable at a relatively low voltage and with high efficiency can be realized.

As has been explained heretofore, the present invention can provide the display device which can realize the highly efficient electron emission characteristics by ensuring the exposure of the carbon nanotubes 13 in the inside of a vacuum by fixing the carbon nanotubes 13 such that the carbon nanotubes 13 are not easily removed from the cathode wires 12 and by ensuring the low resistance of the carbon nanotubes 13 which enables the carbon nanotubes 13 to have the enough electron emission ability.

What is claimed is:

1. A display device performing a display using electrons emitted from electron emitting sources, the display device being characterized in that each electron emitting source includes a large number of carbon nanotubes, the carbon nanotubes cross each other and have contact points, and points of the carbon nanotubes in the vicinity of the contact points are bonded to each other by films made of bonding material.

2. A display device according to claim 1, wherein the films made of bonding material include films produced by baking bonding material which generates a sol-gel reaction by baking.

3. A display device according to claim 2, wherein the films produced by baking bonding material which generates a sol-gel reaction by baking are conductive films.

4. A display device according to claim 2, wherein bonding material made of conductive material is provided in the vicinity of the contact points of the carbon nanotubes.

5. A display device according to claim 4, wherein the bonding material made of conductive material is bonding material produced by baking ultra-fine metal particles coated with resin.

6. A display device according to claim 1, wherein the bonding material is bonding material formed of conductive material.

7. A display device according to claim 6, wherein the bonding material made of conductive material is bonding material produced by baking ultra-fine metal particles coated with resin.

8. A display device according to claim 1, wherein the electron emitting sources are formed on conductive cathode wires and portions of the carbon nanotubes are embedded into the cathode wires.

9. A display according to claim 8, wherein the cathode wires include conductive material which is melted or sintered in a temperature range of 150 degree centigrade to 600 centigrade.

* * * * *